United States Patent
Baumann

(10) Patent No.: US 7,797,640 B2
(45) Date of Patent: Sep. 14, 2010

(54) METHOD FOR GENERATING A FLEXIBLE DISPLAY FIELD FOR A VIDEO SURVEILLANCE SYSTEM

(75) Inventor: Andreas Baumann, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 234 days.

(21) Appl. No.: 11/451,020

(22) Filed: Jun. 12, 2006

(65) Prior Publication Data

US 2007/0074129 A1   Mar. 29, 2007

(30) Foreign Application Priority Data

Sep. 29, 2005   (DE) ........................ 10 2005 046 664

(51) Int. Cl.
*G06F 3/048* (2006.01)
(52) U.S. Cl. .................. 715/781; 715/788; 715/790; 715/792; 715/800; 715/801; 725/37; 725/38; 725/44; 725/47; 725/52
(58) Field of Classification Search ................ 715/781, 715/788, 790, 792, 800, 801; 725/37, 38, 725/44, 47, 52
See application file for complete search history.

(56) References Cited

U.S. PATENT DOCUMENTS

| | | | |
|---|---|---|---|
| 4,798,249 A | | 1/1989 | Hoereth et al. |
| 5,771,042 A | * | 6/1998 | Santos-Gomez ............ 715/800 |
| 6,081,267 A | * | 6/2000 | Stockham et al. ........... 715/788 |
| 6,476,858 B1 | | 11/2002 | Ramirez Diaz et al. |
| 6,810,969 B2 | | 11/2004 | Meixner |
| 6,825,860 B1 | * | 11/2004 | Hu et al. ..................... 715/801 |
| 7,302,648 B1 | * | 11/2007 | Brunner et al. ............. 715/788 |
| 7,549,127 B2 | * | 6/2009 | Chasen et al. ............... 715/788 |
| 2003/0159143 A1 | * | 8/2003 | Chan .......................... 725/41 |
| 2003/0178213 A1 | | 9/2003 | Meixner |
| 2004/0160462 A1 | | 8/2004 | Sheasby et al. |
| 2005/0060658 A1 | * | 3/2005 | Tsukiori ...................... 715/765 |
| 2005/0068549 A1 | * | 3/2005 | Jaeger ......................... 358/1.2 |
| 2005/0200714 A1 | | 9/2005 | Marchese |
| 2006/0095863 A1 | * | 5/2006 | Van Leeuwen .............. 715/788 |

(Continued)

FOREIGN PATENT DOCUMENTS

DE   36 34 282   4/1988

(Continued)

*Primary Examiner*—Kieu Vu
*Assistant Examiner*—Patrick F Riegler
(74) *Attorney, Agent, or Firm*—Michael J. Striker

(57) ABSTRACT

A method for generating a flexible display field on a monitor includes providing a display field with a main window, into which a plurality of information windows are incorporatable and which has a basic grid with a regular raster, allocating individual grid fields to a respective information window for displaying in an assigned grid field, setting a grid stage of a basic field via a central first user control device for the main window, switching the main window between a regular grid occupancy in which a size of each incorporated information window corresponds to a size of one grid field of the basic field, and an irregular grid occupancy in which a size of at least one information window corresponds to a size of an integral multiple of one grid field of the basic grid, and initiating a switchover of a user by a selection and a change in size of an information window and also a video management system and a software program are provided.

14 Claims, 4 Drawing Sheets

U.S. PATENT DOCUMENTS

2006/0279628 A1* 12/2006 Fleming .................... 348/143
2008/0164042 A1    7/2008 Mascall

FOREIGN PATENT DOCUMENTS

| | | |
|---|---|---|
| DE | 197 54 983 | 6/1999 |
| EP | 0 266 305 | 5/1988 |
| EP | 1 935 574 | 6/2008 |
| GB | 2 147 240 | 5/1985 |
| GB | 2 410 212 | 7/2005 |
| WO | 02/092291 | 11/2002 |

* cited by examiner

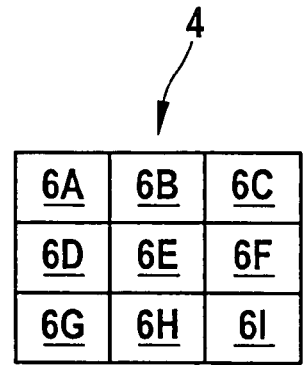
Fig. 5a
PRIOR ART
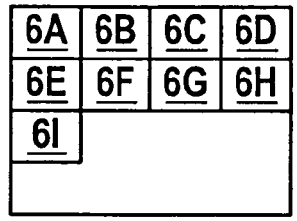 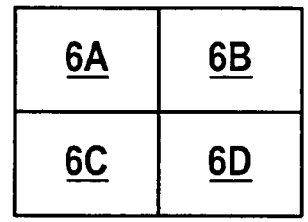
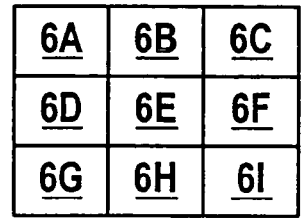
Fig. 5b
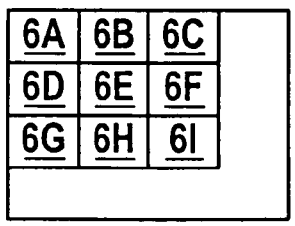 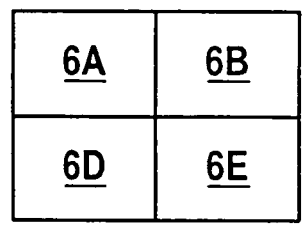

METHOD FOR GENERATING A FLEXIBLE DISPLAY FIELD FOR A VIDEO SURVEILLANCE SYSTEM

CROSS-REFERENCE TO A RELATED APPLICATION

The invention described and claimed hereinbelow is also described in German Patent Application DE 102005046664.8 filed on Sep. 29, 2005. This German Patent Application, whose subject matter is incorporated here by reference, provides the basis for a claim of priority of invention under 35 U.S.C. 119(a)-(d).

BACKGROUND OF THE INVENTION

The present invention relates to a method for generating a flexible display field for a video surveillance system.

Video surveillance systems are used for instance for central monitoring in department stores, parking garages, museums, banks, and so forth, using a plurality of video cameras distributed at various positions. To that end, the image data streams of the individual video cameras are combined and shown either on a plurality of monitors or on a single monitor that has a plurality of image windows.

Displaying a plurality of image fields on a screen is known for instance from German Patent Disclosure DE 197 54 983, which discloses a method for transmitting and/or displaying information. In this method, an intermediate film that interrupts a main film upon transmission and/or display in one field has a display of scenes from the main film superimposed on it, to keep viewers from switching over to a different program even during the intermediate film.

U.S. Pat. No. 6,476,858 B1 involves a video surveillance and security system. In this system, a plurality of information windows are incorporated into a main window, and in each of them a sequence of images, for instance from a surveillance camera, is shown. The size and location of the information windows are set either automatically by the operating system on which the system is based and/or manually by the user. The information windows are continuously adjustable.

In modern digital video surveillance systems, it is by now usual for live video images and optionally other information, such as site plans, to be shown simultaneously in a plurality of information windows, also called "cameos", by means of the processing software. Current software products use two alternative types of display as a user interface: One alternative provides that the individual information windows are not coherent and thus can be individual shifted, reduced and increased in size, or overlapped. In the other alternative, the images shown share a common display field, and the information windows are arranged in regular grids, such as 2×2, 3×3, 4×4, or in irregular grids, such as 5.1, 7.1. This last alternative for the type of display forms the closest prior art.

SUMMARY OF THE INVENTION

Accordingly, it is an object of the present invention to provide a method for generating a flexible display field for a video surveillance system which is a further improvement of the existing methods.

The method of the invention forms a man-to-machine interface (or user interface) and has the advantages of ease of use and clarity of display, with simultaneously good adaptability to a given use, particularly the particular surveillance situation involved. Information, especially video information, is processed, located, and displayed graphically in such a way that optimal transmission of the information to the human user is possible.

To that end, a software program when executed on appropriate hardware creates a flexible display field on a monitor, which includes a main window. Many operating systems, such as Microsoft Windows, and Linux, support such display fields. Information windows or cameos, and in particular discrete subregions, with graphic information are incorporated inside this main window.

The main window has a basic grid with a regular raster, and one information window can be and/or is incorporated into each of the grid fields. The grid fields are preferably dimensioned such that a user can remove at least some of the graphic information content of the information windows.

The grid stage of the basic grid is settable by the user, by means of a first user control device. The grid stage describes a fixed number and arrangement of grid fields, which are shown in the main window, in a basic grid. Possible and useful settings are for instance grid stages, so that a full image, or 2×2, 3×3, 4×4, 5×5 information windows, can be displayed inside the main window. The first user control device may for instance be embodied as a software switch, in particular a shift controller, or a numerical input.

The main window can be switched over in its display, specifically from a regular grid occupancy to an irregular grid occupancy; both grid occupancies use the same basic grid. In the regular grid occupancy, each grid field is occupied, or can be occupied, by an information window, but not all the grid fields absolutely need to be occupied. The information windows are adapted in size to the grid field size. In particular, in the regular occupancy, the information windows are located side by side, without overlapping. In the irregular grid occupancy, at least one information window extends across a plurality of grid fields, and the size of this information window corresponds to the size of an integral multiple of one grid field of the basic grid. In particular, the size of the information windows corresponds to the square number multiple, for instance 4, 9, 16 or 25 times one grid field.

In the invention, the switchover between regular and irregular grid occupancy can be and/or is initiated by a user, specifically in that the user selects an arbitrary information window and changes its size. To that end, the user can select any arbitrary information window. In particular, the grid stage once set is not changed by the switchover.

The invention is based on the concept of decoupling the setting of the grid stage of the basic grid from the setting of the grid occupancy or shape of the basic grid. As a result, the user is put in a position to make intentional changes in the display, without having to dispense entirely with a certain basic ordering of the display. By the provisions recited in the dependent claims, advantageous refinements of and improves to the method defined by main claim are possible.

It is advantageous if for the change in size, two user control devices are provided, and a second user control device is assigned to each information window. Preferably, the first and second user control devices are embodied separately and/or independently of one another. This embodiment carries the inventive concept onward of being able to set the grid stage and the grid occupancy independently of one another. In a preferred refinement, the second user control device is embodied as a variable-size frame of the information window that is or can be operated interactively using a computer mouse. This makes intuitive user operation and setting of the flexible display field possible. To further support the user, a sensitive region inside the frame may be provided, which is visually highlighted as the mouse pointer crosses it and shows the user the position at which he can access the frame using the mouse pointer. The sensitive region may for instance be highlighted by means of a graphical overlay with a semitransparent image.

It is advantageous if the method enables the change in size solely in discrete steps, or in other words if a continuous change in size is precluded. Preferably, a change in size is made only if the frame is dragged with the mouse in such a way that a boundary line, especially a diagonal, through an adjacent grid field is crossed over by the corner point of the frame that has been engaged. The boundary line is preferably located transversely to the direction of motion of the corner point. Once the diagonal has been crossed over, the information window snaps to the next possible size. This embodiment assures that the size of the information window or information windows can be and/or is set without changing the grid stage, while at the same time optimal utilization of the display field inside the main window is assured.

It is also advantageous if the information windows are assigned in terms of data to the grid spaces in the basic grid, and if this assignment is preserved when the grid stage and/or the grid occupancy is modified. Preferably, the assignment can be changed by the user. With this kind of fixed assignment, even in various kinds of displays, the geometric arrangement is maximally preserved, so that the user does not have to accustom himself to a new arrangement of the information windows after every time the display is changed. In this way, a memory function is realized.

At the transition from a regular to an irregular grid occupancy, by enlargement of an information window, adjacent information windows are preferably hidden by the enlarged information window. When the enlarged information window is reduced in size, the covered information windows again become visible. With this embodiment, on the one hand the geometric arrangement of the information windows is preserved, and on the other, the assumption is that the user wants it this way.

It is also preferable if, in the event that all the spaces in the grid are fully occupied, and the grid stage has been set more closely by the user, when the original grid is restored the grid spaces are again filled with their original occupancy.

In a preferred embodiment of the method, the information windows have a video image field. Besides the video image field, the information windows may have information and/or user control fields, in which for instance text and icons, as information carriers, and buttons for controlling the information window are arranged. The information and/or user control fields are preferably embodied as information strips, especially with one vertical and one horizontal strut. Optionally, the strips can be masked.

It is advantageous if the main window and/or the information window or all the information windows and/or the video image field and/or the information strips all have the same width-to-height ratio, for instance of 4:3. This embodiment is based on the idea that video regions have fixed ratios of their sides, especially 4:3, and consistently using this ratio of sides assures optimal utilization of the space in the main window.

The video management system of the invention has a first interface for parallel infeeding from a plurality of video sources. The video sources may be embodied as video cameras and/or as digital or analog video memories. A second interface is embodied for connection to one or more display devices. Instead of a display device, however, a digital or analog video recorder may be connected via the second interface. According to the invention, it is provided that the video management system has the software program described above. The video management system is preferably embodied as a personal computer with an insertable card and/or as an embedded system.

Also disclosed is a software program for creating a flexible display field on a monitor, preferably by a method and/or a video management system as described above; in one step, the grid stage for a basic grid in a main window is defined, and in another step, without changing the grid stage of the basic grid, the size of an arbitrary information window is changed. Instead of being embodied as the software program, the video management system may be embodied by circuitry for generating the functions described. A mixture of circuitry and programming for implementing the functions described can also be provided.

One exemplary embodiment of the invention is shown in the drawings and described in further detail in the ensuing description. Elements corresponding to one another are identified by the same reference numerals in all the drawings.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 5a, b show a comparison of the behavior of the grid occupancy when the grid stage is changed, in conventional video management systems and in the video management system of FIG. 1;

DESCRIPTION OF THE PREFERRED EMBODIMENTS

Figure 1:
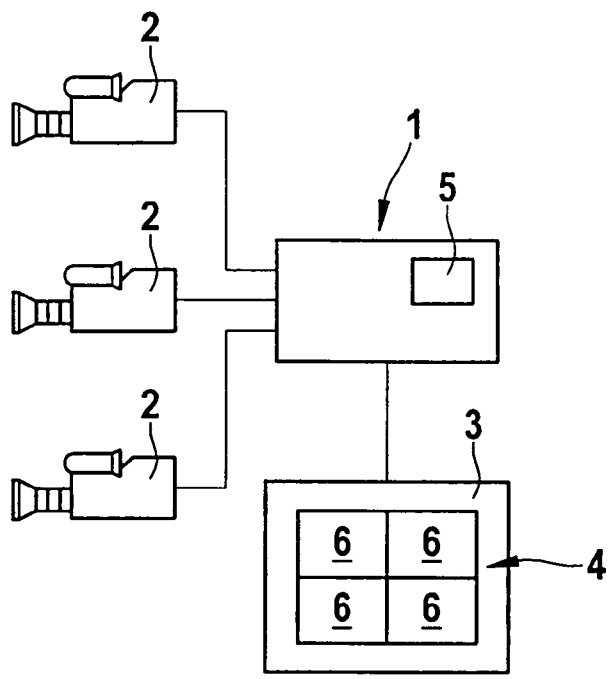
FIG. 1 shows one exemplary embodiment of a video management system in a schematic illustration.

FIG. 1 shows an exemplary embodiment of a video management system 1, which is wired for taking on image data streams with cameras 2 and for displaying the image data streams on a monitor 3. For creating a flexible display field with a main window 4, a software program 5 is provided in the video management system and runs in the video management system. In the main window 4, there are information windows 6, and one of the cameras 2 is assigned to at least some of the information windows 6 in such a way that the image data stream of the assigned camera 2 is displayed in the corresponding information window 6. Optionally, digital or analog video recorders may be connected, or modules for motion detection may be provided in the video management system 1.

Figure 2A:
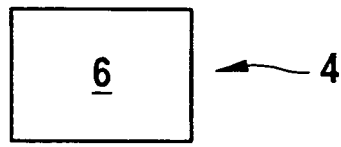
FIGS. 2a-e show the main window of FIG. 1 with various regular grid occupancies.
Figure 2B:
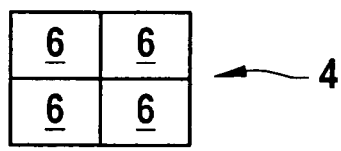
Figure 2C:
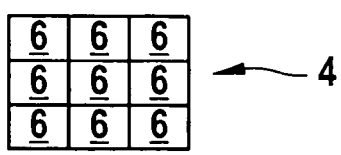
Figure 2D:
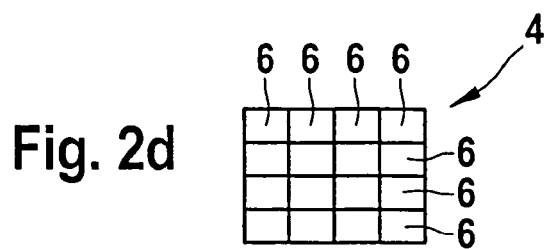
Figure 2E:
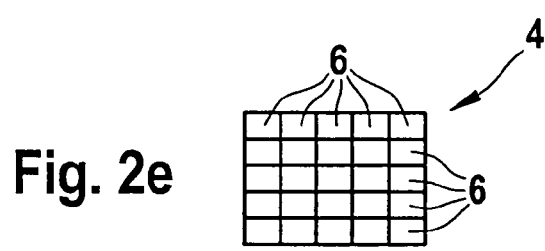

FIGS. 2a-e show the main window 4 with the information windows 6, which are arranged in five different, regular grid occupancies; FIG. 2a shows a 1×1 basic grid, FIG. 2b a 2×2 basic grid, FIG. 2c a 3×3 basic grid, FIG. 2d a 4×4 basic grid, and FIG. 2e a 5×5 basic grid. Thus a square number, namely 1, 4, 9, 16 and 25, of information windows 6 are arranged in the main window 4. The information windows 6 are located adjoining one another, so that the entire display field of the main window 4 is fully utilized. The ratio of the sides in terms of width to height is thus 4:3, both for the main window 4 and for each of the information windows 6. In the information windows 6, information, user control elements, and/or video display fields can be displayed. The user makes the switchover among the main windows 4 shown in FIGS. 2a-e by means of setting the grid stage of the basic grid of the main window 4.

Figure 3:
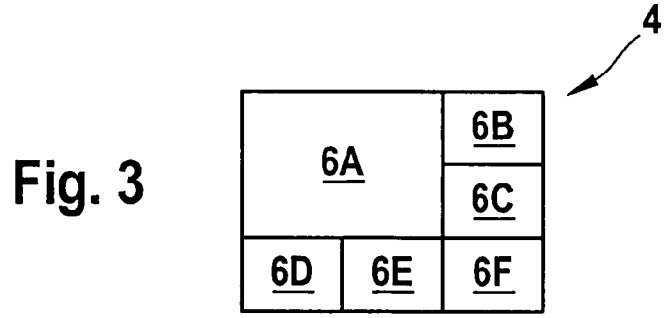
FIG. 3 shows the main window of FIG. 1 with an irregular grid occupancy.

FIG. 3 shows the main window 4 with a 3×3 basic grid; the information windows 6A-F are arranged in an irregular 5.1 grid occupancy; that is, five information windows 6 B, C, D, E, F are the size of one grid field, and one information window 6A has a different size, extending over four grid fields of the basic grid of the main window 4.

Figure 4:
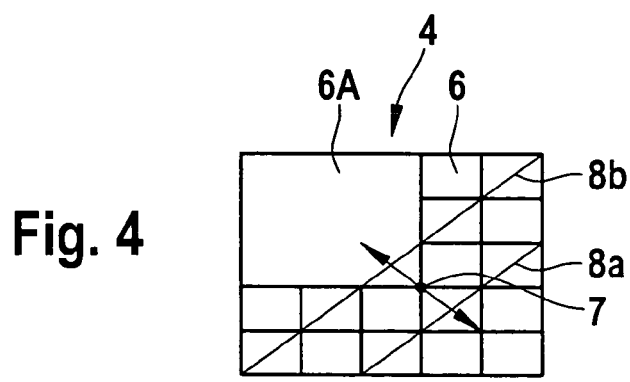
FIG. 4 shows the main window in Fig. with an irregular grid occupancy, to illustrate the change in size of information windows.

FIG. 4 shows the main window 4 with a 5×5 basic grid in an irregular grid occupancy 16.1; in this size, the information window 6A occupies nine grid fields of the basic grid. The user can make the information window 6A larger or smaller by engaging its corner 7 with the mouse pointer of a computer mouse and shifting the engaged corner 7 diagonally in a displacement direction, until the desired size of the information window 6A is attained. To obtain a basic ordering in the display for the sake of orienting the user, the size of the information window 6A can be adjusted only in stages; thus the size of the information window 6A is an integral multiple of the area of one grid field of the basic grid, and in particular it corresponds to the area of a square number of grid fields.

For implementing this step function, it is provided that a change in size of the information window 6A is done only if the corner 7 is dragged across a diagonal 8a, 8b extending transversely to the displacement direction and through the corners of the grid fields of the basic grid. In the case of the main window 4 in FIG. 4, the information window 6A is accordingly enlarged as soon as the corner 6 is dragged across the diagonal 8a and is reduced in size as soon as the corner 6 is dragged across the diagonal 8b and is released via the mouse. In an optional embodiment, when the information window 6A is made larger, other information windows 6 are hidden. When the information window 6A is later reduced in size again, these hidden information windows 6 become visible again.

FIGS. 5a and 5b show a comparison of the change in the arrangement of the information windows 6A-I in the main window 4 when a change is made in the grid stage, in the prior art and in an optional embodiment of the video management system 1 in FIG. 1, respectively. Based on a main window 4 with a 3×3 basic grid, which is occupied by nine information windows 6A-I in a regular grid occupancy, the grid stage is changed to a 4×4 basic grid with finer resolution and to a 2×2 basic grid with coarser resolution.

In FIG. 5a, when a change is made in the grid stage, the information windows 6A-I are rearranged, especially such that the information windows 6A-I are lined up in rows in accordance with their index letter. In FIG. 5b, when a change is made in the grid stage, the geometric arrangement of the information windows 6A-I to one another is preserved. This behavior takes account of the user's cognitive perception. For realizing the preservation of the geometric arrangement, it is provided for instance that one grid space in the basic grid is assigned to each of the information windows 6A-I, and this assignment is preserved for the newly selected grid stage. It is understood that the assignment can be changed by the user. In FIG. 5b, the information windows 6A-I are assigned to the grid spaces of the 3×3 basic grid. If the grid stage is made finer, being changed to 4×4 basic grid, the information windows 6A-I are shown, in the same geometric arrangement, in the top left region of the main window 4. If the grid stage is made coarser, being changed to a 2×2 basic grid, only the top left region of the 3×3 basic grid, with the associated information windows 6 A, B, D, E is shown. Upon an ensuing change in the grid stage to the outset state of the 3×3 basic grid, the original distribution is again displayed.

Figure 6:
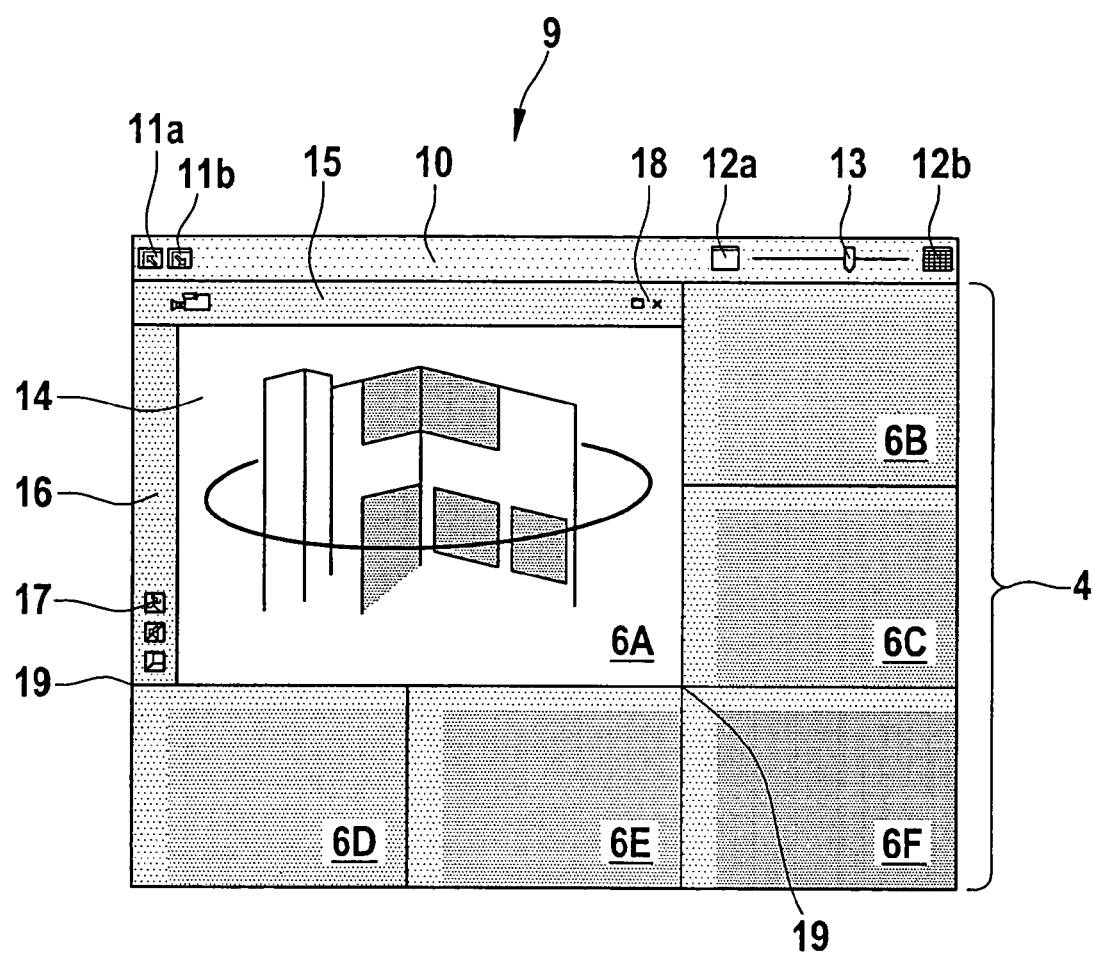
FIG. 6 shows an exemplary embodiment of a main window of FIG. 1.
Figure 7:
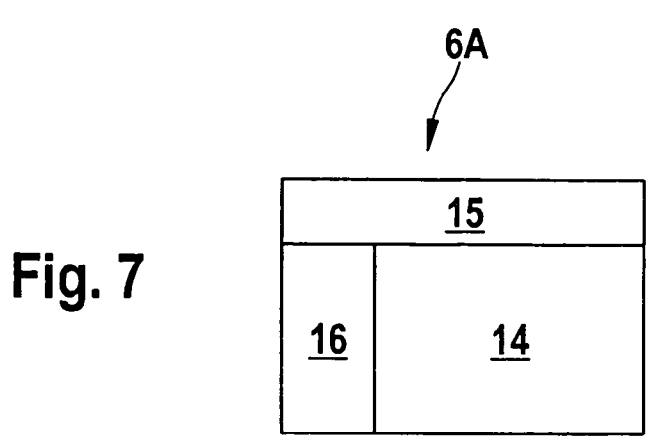
FIG. 7 shows an information window of the main window of FIG. 5.

FIG. 6 shows a printout of a screen from an exemplary embodiment of a flexible display field 9 with the main window 4, with information windows 6 A-F located in it. The main window 4 has a 3×3 basic grid with an irregular 5.1 grid occupancy; the information window 6A occupies the space of four grid fields of the basic grid. FIG. 7 shows the basic structure of the information window 6A.

The flexible display field 9 includes both the main window 4 and a user control strip 10. The main window 4 and the information windows 6A-F have a width-to-height ratio of 4:3, in accordance with current video formats. In the user control strip 10, buttons 11a and b for activating and deactivating additional functions, buttons 12a and b for setting the grid stage of the basic grid in stages, and a shift controller 13 for displaying the grid stage that has just now been set and as a way of setting the grid stage directly are all provided.

The information window 6A has an image region 14, in which, in the example in FIG. 6, an MPEG video is shown. Inside the information window 6A, there is a horizontal strip 15 at the top and a vertical strip 16 on the left, for showing information window-specific information and functions. For instance, symbols 17 are shown pertaining to the content of the image region 14 or function buttons 18 (in this case for closing and maximizing the information window 6A within the display field 9). Possible additional functions are: maximizing/minimizing; full frame; closing; switchover from live to playback; audio on/off; save/print snapshot; digital zoom. Other possible information may be the name of the camera; status: digital zoom; status: audio; motion detected; within an automatic image switchover ("sequence"); status: live/playback.

The strips 15 and 16 are dimensioned and located such that the information window 6A and the image region each have a width-to-height ratio of 4:3. Optionally, the strips 15 and 16 can be masked via the buttons 11a, b.

At the corners 7 of the information window 6A, handles 19 are provided, which a mouse pointer can grasp in order to change the size of the information window 6A in stages in the frame of the currently selected grid stage. When a change in size is made, the procedure is preferably that first, the information window is selected by clicking on it with the mouse. If the mouse pointer is then moved across a corner 7 or a handle 19, then this region—also called a sensitive region—lights up as a semitransparent, colored field for the sake of orienting the user. The user can grasp the handle 19 by pressing the mouse button and holding it down and can drag the information window 6A to the desired size. As soon as the desired size is reached, the user lets go of the mouse button.

It will be understood that each of the elements described above, or two or more together, may also find a useful application in other types of constructions differing from the types described above.

While the invention has been illustrated and described as embodied in a method for generating a flexible display field for a video surveillance system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A method for generating a flexible display field on a monitor, comprising the steps of providing a display field with a main window, into which a plurality of information windows are incorporatable and which has a basic grid with a regular raster; allocating individual grid fields to a respective information window for displaying in an assigned grid field; setting a grid stage of a basic field via a central first user control device for the main window; switching the main window between a regular grid occupancy in which a size of each incorporated information window corresponds to a size of one grid field of the basic field, and an irregular grid occupancy in which a size of at least one information window corresponds to a size of an integral multiple of one grid field of the basic grid; initiating a switchover of a user by a selection and a change in size of an information window; and effecting the switchover as soon as a corner point of a frame attached by and dragged with a computer mouse is moved just beyond a diagonal of an adjacent grid field.

2. A method as defined in claim 1; and further comprising providing, for the change in size, two user control devices; and assigning a second user control device to each information window.

3. A method as defined in claim 2; and further comprising embodying the second user control device as a frame which is variable interactively in size by a computer mouse, of the information window.

4. A method as defined in claim 3; and further comprising, on crossing over a user-controllable corner of the frame, visually highlighting the corner.

5. A method as defined in claim 1; and further comprising assigning the information windows in terms of data to grid spaces in the basic grid or another matrix; and preserving this assignment if at least one of the grid stage and the grid occupancy is modified.

6. A method as defined in claim 1, wherein at a transition from the regular grid occupancy to the irregular grid occupancy, hiding a portion of the information windows by an enlarged information window.

7. A method as defined in claim 1; and further comprising embodying the information windows at least in part with a video image field.

8. A method as defined in claim 7; and further comprising providing the information window, besides a video image field, with an additional field selected from the group consisting of an information field control field, a user control field, and both.

9. A method as defined in claim 8; and further comprising embodying the additional field as information strips with one vertical strip and one horizontal strip.

10. A method as defined in claim 9; and further comprising configuring an element selected from the group consisting of the information window, the video image field, information strips and combinations thereof, with a uniform width-to-height ratio.

11. A method as defined in claim 10; and further comprising selecting the uniform width-to-height ratio of 4:3.

12. A video management system having a first interface providing parallel in feeding from a plurality of video sources, and a second interface providing connection to display device, said video management system being configured to operate in accordance with a method comprising the steps of providing a display field with a main window, into which a plurality of information windows are incorporatable and which has a basic grid with a regular raster; allocating individual grid fields to a respective information window for displaying in an assigned grid field; setting a grid stage of a basic field via a central first user control device for the main window; switching the main window between a regular grid occupancy in which a size of each incorporated information window corresponds to a size of one grid field of the basic field, and an irregular grid occupancy in which a size of at least one information window corresponds to a size of an integral multiple of one grid field of the basic grid; initiating a switchover of a user by a selection and a change in size of an information window; and effecting the switchover as soon as a corner point of a frame attached by and dragged with a computer mouse is moved just beyond a diagonal of an adjacent grid field.

13. A video management system as defined in claim 12, wherein said video management system is embodied as a system selected from the group consisting of a personal computer with an insertable card, an embedded system, and a server that is capable of networking.

14. A computer program product, comprising:
a tangible storage medium readable by a processing circuit and storing instructions for execution by the processing circuit for performing a method comprising the steps of providing a display field with a main window, into which a plurality of information windows are incorporatable and which has a basic grid with a regular raster; allocating individual grid fields to a respective information window for displaying in an assigned grid field; setting a grid stage of a basic field via a central first user control device for the main window; switching the main window between a regular grid occupancy in which a size of each incorporated information window corresponds to a size of one grid field of the basic field, and an irregular grid occupancy in which a size of at least one information window corresponds to a size of an integral multiple of one grid field of the basic grid; initiating a switchover of a user by means of a selection and a change in size of an information window, wherein the program is executed on a computer; and effecting the switchover as soon as a corner point of a frame attached by and dragged with a computer mouse is moved just beyond a diagonal of an adjacent grid field.

* * * * *